United States Patent [19]

Matsufuji

[11] Patent Number: 4,521,785

[45] Date of Patent: Jun. 4, 1985

[54] IMAGE FORMING DEVICE

[75] Inventor: Yohji Matsufuji, Tokyo, Japan

[73] Assignee: Canon Kabushiki Kaisha, Tokyo, Japan

[21] Appl. No.: 503,854

[22] Filed: Jun. 13, 1983

[30] Foreign Application Priority Data

| | | | |
|---|---|---|---|
| Jun. 21, 1982 | [JP] | Japan | 57-107246 |
| Jun. 21, 1982 | [JP] | Japan | 57-107247 |
| Jun. 21, 1982 | [JP] | Japan | 57-107248 |
| Jun. 21, 1982 | [JP] | Japan | 57-107249 |

[51] Int. Cl.³ .......... G01D 9/00

[52] U.S. Cl. .......... 346/25; 156/247; 346/134; 346/140 R

[58] Field of Search .......... 346/140 R, 75, 1.1, 346/134, 135.1, 25; 156/230, 239, 240, 241, 247, 249

[56] References Cited

U.S. PATENT DOCUMENTS

| | | | |
|---|---|---|---|
| 2,733,180 | 1/1956 | Pinto | 156/240 X |
| 3,549,447 | 12/1970 | Bresnick | 156/247 X |
| 3,926,707 | 12/1975 | Glaser | 156/247 X |

*Primary Examiner*—Joseph W. Hartary

*Attorney, Agent, or Firm*—Fitzpatrick, Cella, Harper & Scinto

[57] ABSTRACT

An image forming device is provided which comprises a means for supplying a recording medium for transfer, a means for recording on said recording medium, a means for supplying a transfer-receiving member, a means for pressure contacting to said recording medium with said transfer-receiving member. The recording medium for transfer has an ink receptive layer laminated on its substrate so that said receptive layer can be peeled off from said substrate.

3 Claims, 4 Drawing Figures

IMAGE FORMING DEVICE

BACKGROUND OF THE INVENTION

1. Field of the Invention

This invention relates to an image forming device equipped with a transfer system of a recording layer on which image formation is performed with ink.

2. Description of the Prior Art

Recently, there is a demand to observe (color) images of photographs, figures or letters prepared according to an ink jet recording system or a thermographic recording system particularly using a transmitted light. For example, in original images for overhead projectors(-hereinafter abbreviated as OHP) or for photographic panels equipped with background illumination, there have been utilized light-transmissive substrates such as resin films or glasses on which images are printed.

Whereas, most of such light-transmissive substrates are generally poor or entirely deficient in ink absorbability, and therefore it has heretofore been pointed out that transmissive type images are difficult to prepare by using the ink jet recording system or the thermographic recording system.

For example, referring to the case in which ink jet recording is applied on a resin film, even if ink is attached onto a film, it can scarcely be absorbed by the film, whereby the ink cannot be fixed on the film but flows over the film surface to cause disadvantageously image disturbances or image defects as the result of peeling-off of the ink from the film.

In view of such drawbacks, there have been attempts to provide an ink absorbing layer comprising a water-soluble resin paint on a resin film. In such instances, however, the ink adhered onto the film tends to diffuse within the absorbing layer to create new drawbacks such that the ink dots run or have insufficient density to make it difficult to produce images of high quality (the material on which images have been formed will hereinafter be called a printed product).

SUMMARY OF THE INVENTION

An object of the present invention is to form a printed product of high quality even on a substrate deficient in ink absorbability.

Another object of the present invention is to form a printed product suitably for observation by either projection or transmission system.

A further object of the present invention is to form a printed product having excellent resistance to water, light and staining.

A still further object of the present invention is to form a printed product having a luster and also good coloration characteristic.

According to an aspect of the present invention, there is provided an image forming device, comprising a means for supplying a recording medium for transfer, a means for performing recording on said recording medium, a means for supplying a medium to receive transfer (hereinafter referred to as a transfer-receiving member), a means for pressure contacting said recording medium with said transfer-receiving member through lamination, and a means for separating said recording medium from said transfer-receiving member.

DESCRIPTION OF THE PREFERRED EMBODIMENTS

Figure 1:
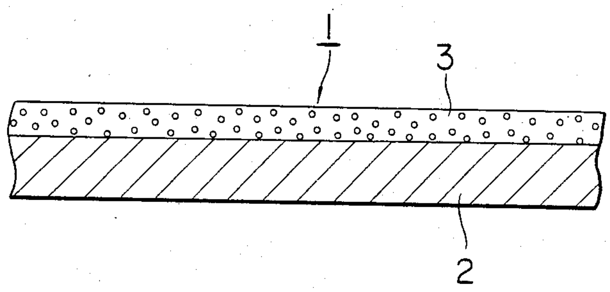
FIGS. 1 through 3 are schematic sectional views for outlined explanation of the image forming principle of the present invention.

Referring now to the drawings and preferred embodiments, the present invention is to be described in detail.

Figure 2:
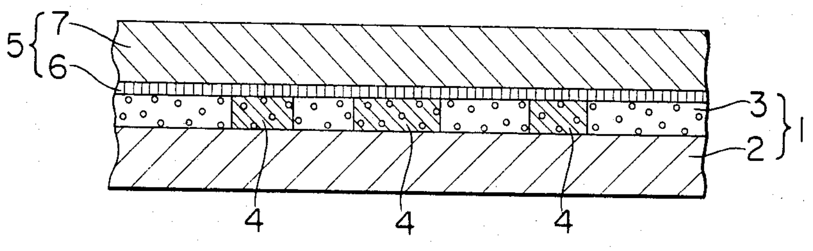
Figure 3:
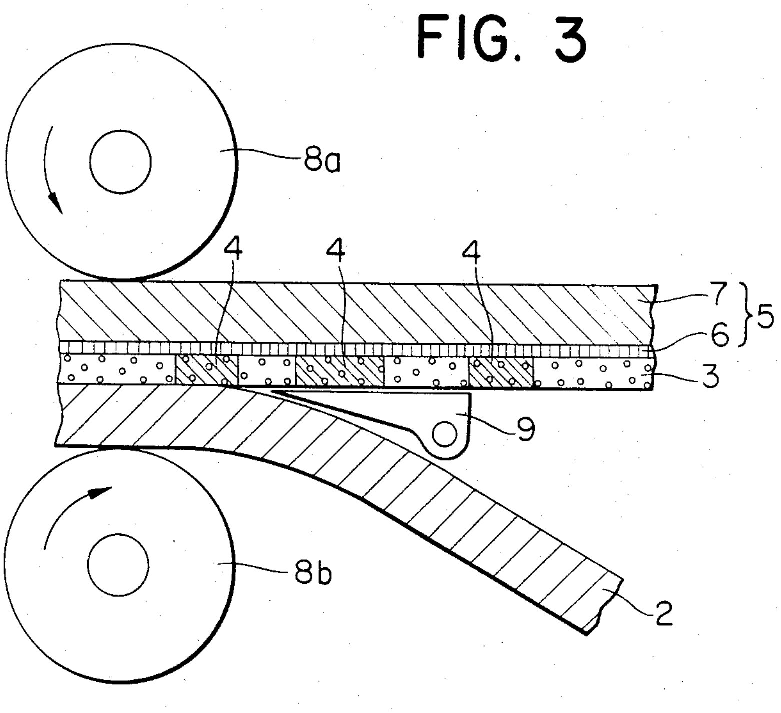

First, the image forming principle of the present invention is outlined with reference to FIGS. 1 through 3.

FIG. 1 shows a schematic sectional view of the recording medium 1 for transfer, in which 2 is a substrate consisting of a material such as paper, cloth, resin, metal, alloy, glass, wood, etc. The substrate 2 may be either absorptive of ink or not, but when an ink is desired to be fixed rapidly, it is desirable to use a porous material having ink absorbability such as paper, cloth, a resin subjected to porous treatment, wood, etc.

And, 3 is a coating layer as the ink receptive layer. The coating layer is constituted basically of a film-forming resin paint, which may further incorporate various surfactants or porous inorganic particles therein. Such surfactants or porous inorganic particles serve to raise the percentage of the pigment (e.g. dye) in the ink taken up by the coated layer 3, and it is desired to utilize positively such components. As such components to be used in the present invention, it is particularly effective to employ white type inorganic pigments which are porous and have ionic properties on the particle surfaces. More specifically, there may be employed natural zeolites, synthetic zeolites (e.g. Molecular sieve, produced by Union Carbide Co.), diatomaceous earth, kaolin clay, talc, $CaCO_3$, $MgSi_2O_3$, $TiO_2$, fine powdery silica (average particle size: 1$\mu$ or less), silica (average particle size: 20$\mu$ or less), synthetic mica, and the like.

In this connection, as the surfactant, there may be employed almost all of various surfactants of cationic type, anionic type or nonionic type which have been used in the prior art as dispersants, lustering agents, color modifiers, etc. And, these surfactants can be used in combination with the aforesaid inorganic pigments.

In the present invention, these particles (particles generally of some hundred microns to serveral microns) may be used alone or as a mixture of several kinds and mixed by grinding with a resin solution to prepare a paint for coating. As the resin to be used in this paint, there may be used any of water-soluble resins or resins soluble in organic solvent. For example, water-soluble resins may include polyvinyl alcohol, starch, casein, gum arabic, glue, gelatin, polyacrylamide, carboxymethyl cellulose, sodium polyacrylate, sodium alginate, etc. As the resins soluble in organic solvents, there may be mentioned polyvinyl butyral, polyvinyl chloride, polyvinyl acetate, polyacrylonitrile, polymethyl methacrylate, polyvinyl formal, melamine resins, polyamide resins, phenol resins, polyurethane resins, alkyd resins, etc. And, the ratio of mixing of the aforesaid inorganic pigment particles and the resin component may be generally 5 to 20 parts by weight of the resin component relative to 100 parts of the inorganic pigment.

For forming the above coating layer 3, a paint may be applied on the surface of the substrate 2 according to a known method (e.g. roll coating, rod bar coating, spray coating) in an amount generally of about 1 $g/m^2$ to 10 $g/m^2$. Practically, it is preferred to apply coating in an amount of about 2 $g/m^2$ to 5 $g/m^2$. After such a coating layer is provided, it is dried as soon as possible.

Meanwhile, in the present invention, transfer of the coated layer 3 is effected in the course of formation of the printed product and therefore the coating layer 3 is required to be readily peeled off from the substrate 2.

For this purpose, there may be the method in which the surface of the substrate 2 is made smooth or is coated with a releasing agent before the above-mentioned coating layer is formed thereon.

Also, for the same purpose, there may also be used as the constituent resin in the coated layer 3 a resin with relatively smaller content of active (polar) groups or to suppress the resin content in the paint at a lower level.

Since there is no formal standard for measuring such releasability of the coating layer 3, the judgement standard as a measure in the present invention is to be described below.

On the surface of the coating layer 3 of the recording medium for transfer obtained according to the method as described above, a tacky tape (commercially available Callotape) with a width of 18 mm is sticked and then peeled off. The resistance (load) exhibited by the coating layer 3 during the peeling off of the tacky tape is defined as the peel-off strength.

In the present invention, a recording medium for transfer 1 having this peel-off strength of approximately less than 10 g/mm is preferred. Further, for avoiding formation of transfer irregularities or transfer defects, a recording medium for transfer with a peel-off strength of 5 g/mm is more preferable.

However, a recording medium with an extremely low peel-off strength is not desirable, because difficulties are encountered in preparation, particularly in the coating operation of the paint itself, and moreover the coating layer 3 is readily dropped off from the substrate 2 by slight impact.

Accordingly, the lower limit of the peel-off strength of the coating layer 3 should desirably be made 0.3 g/mm in practical applications.

As the substrate 2, as mentioned above, there may be employed various materials, regardless of ink absorbability thereof. In particular, when a material poor or entirely deficient in ink absorbability is employed as the substrate 2, it may be desired to provide a coating layer thicker than the ordinary ones by way of multi-layer constitution or the like.

Also, the form of the recording medium for transfer 1 may be any one of sheets, rolls, etc. depending on the use or the form of the transfer-receiving member (not shown).

Next, after formation of any desired image 4 on the recording medium for transfer 1 thus obtained, the transfer-receiving member 5 is laminated on the surface of the coated layer 3 (FIG. 2). During this operation, the tacky layer 6 provided on one surface of the transfer-receiving member 5 is positioned face to face with the coated layer 3. In this connection, 7 in this Figure shows the body of the transfer-receiving member composed of a material such as semi-transparent to transparent (colorless to pale colored) glass or resin, and its form may be any of a plate, sheet, rolled film, etc. Among them, a resin film having an appropriate flexibility is the most preferred for easy transferring operation.

As the resin constituting the body 7, there may be mentioned known polymers and copolymers, but they are not particularly limited. The examples of such resins are exemplified below.

That is, there may be employed polyvinyl chloride, polystyrene, polyacrylonitrile, polyvinyl acetate, cellulose acetate, polyvinyl butyral, acrylic resins, polyamide resins, styrene-butadiene latex, alkyd resins, polyvinyl alcohol, polyester resins.

Further, plasticizers may be added to these resins. Examples of plasticizers are dibutyl phthalate, dioctyl adipate, polyethylene glycol, chlorinated paraffin, etc.

The tacky layer 6 may be formed with any one of the so-called adhesives which are liquid, semi-solid or solid at normal temperature, only if inconveniences in handling may be disregarded.

However, when simple handling is to be made much of, it is desirable to form the tacky layer 6 with the use of a semi-solid adhesive which exhibits viscosity to some extent under normal temperature or a hot melt type resinous adhesive which is solid under normal temperature.

Although not shown in the drawing, it is also possible to provide the same tacky layer on the other surface of the body 7. In this case, after the image-bearing coating layer 3 is transferred onto the side of the tacky layer 6 shown in the drawing in the step as described later, the transfer-receiving member having formed the printed product can be adhered onto any member with the adhesive layer on the other surface. That is, it can be utilized as a so-called seal material attached with images. By the way, when the aforesaid tacky layer (not shown) exhibits tackiness at normal temperature, the tacky layer may be desired to be laminated with a pasteboard. And, when necessary, the pasteboard may be peeled off so as to effect adhesion of the transfer-receiving member having formed images.

Then, as shown in FIG. 3, after passing the recording medium for transfer 1 and the transfer-receiving member 5 laminated as shown in FIG. 2 through a pressurizing instrument such as a pair of the pressure rollers 8*a*, 8*b*, a separation operation is performed by means of a separating nail 9, whereby the coating layer 3 is peeled off from the substrate 2 and transferred onto the transfer-receiving member 5. The separating nail 9 employed here is merely one example of separating means, and in place thereof, it is also possible to use, for example, separating rollers, separating belts, etc. as desired.

The separating operation as described above is not necessarily required to be performed immediately after passing between the pressure contact roller pair 8*a*, 8*b*, but the closely contacted recording medium for transfer 1 and the transfer-receiving member 5 may be stored for a certain period of time, and thereafter the separating operation may be done by manual working, when necessary.

When the tacky layer 6 is constituted of a hot melt type adhesive, either one of the pair of rollers 8*a* and 8*b* is equipped with a heater.

By the way, when there is distinction between the face and the back in the transferred image, the mirror image of the original image should be printed when it is to be observed according to a reflection system, although no such measure may be taken when it is to be observed according to a transmission system.

Although it is not essentially required in the present invention, the surface of the coating layer transferred onto the transfer-receiving member 5 as described above may be desired to be further coated with a resin solution, followed by drying, to provide a transparent resin film thereon, or laminated with a transparent resin film, for protection of the coated film 3.

By doing so, even when an impact is applied on the coating layer 3, its drop-off can be prevented, and there can also be obtained the effects of prevention of contamination of the images as well as improvement of water resistance and light resistance. Further, in case of color images, there can be obtained an additional effect of increased brightness of color.

Referring here to the drawings, an embodiment of the present invention is to be described.

Figure 4:
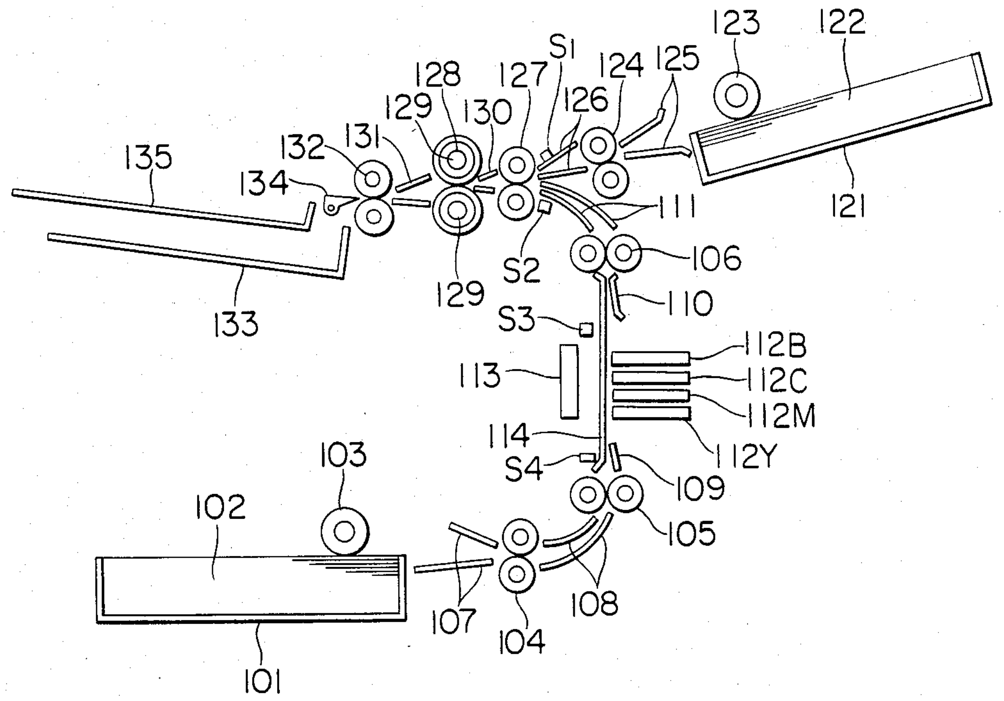
FIG. 4 is an internal constitution showing one example of the present invention.

FIG. 4 shows an example of the multi-ink jet printer to which the present invention has been applied.

In this Figure, 101 is a recording paper cassette housing the recording paper 102, and 103 is a paper feeding roller for feeding the recording paper 102. 104 is a registration roller pair, 105 and 106 are conveying roller pairs for travelling recording paper 102, and, 107, 108, 109, 110 and 111 are conveying guides for conveying smoothly the recording paper 102. 112Y, 112M, 112C and 112B are ink jet recording heads for discharging color inks of yellow, magenta, cyan and black, respectively, onto the recording paper 102, which effect reproductive recordings of color images on the recording papers 102 based on the image signals from the image reading means not shown in the drawing. These recording heads are constituted, for example, as the so-called full multi-head, in which they are arranged in full line in the direction substantially perpendicular to the travelling direction of the recording paper, namely in the direction perpendicular to the paper surface in the drawing. 113 is a suction fan and 114 is a porous guide plate. By means of this suction fan, the recording paper 102 is attracted to the guide plate 114 to keep the flatness of the recording paper, whereby the intervals between the recording paper 102 and the recording heads 112Y, 112M, 112C and 112B can be maintained best.

The recording paper 102 employed here was prepared for the purpose of later transfer, specifically by coating a paint obtained by grind mixing 3 g of polyvinyl alcohol, 20 g of zeolite powders and 1 g of $CaCO_3$ powders at a ratio of 3 g/m$^2$ on a substrate paper of a basis weight of 65 g/m$^2$, followed by drying. In this connection, the coated layer exhibited a value of 3 g/mm, in terms of the peel-off strength as described above.

Next, 121 is a cassette of the transfer-receiving member housing the transfer-receiving member 122, and 123 is a feeding roller for feeding the member 122. In this connection, the transfer-receiving member 122 employed here is a transparent polyester sheet with a thickness of about 0.2 to 0.5 mm having applied uniformly a hot melt adhesive on one surface thereof.

124 is a registration roller pair for the transfer-receiving member 122. 125 and 126 are conveying guides for conveying smoothly the transfer-receiving member 122. 127 is a conveying roller pair, and as described hereinafter, the recording paper 102 on which images have been formed is pinched between the roller pair 127 with the transfer-receiving member 122 fed from the cassette 121 superposed on its surface to receive the images. 128 is a pressure roller pair equipped internally with a heater 129, and it pressurizes under heating the recording paper 102 conveyed by the conveying roller pair 127 with the transfer-receiving member 122. That is, the transfer-receiving member 122 is laminated on the surface to receive the image on the recording paper 102. 130 and 131 are conveying guides, 132 is a discharging roller pair, 133 and 135 are discharging trays, and 134 is a separating nail.

The recording paper having passed through the pressure roller pair 128 and laminated with the tranfer-receiving member 122 is slightly subjected to squeezing between the discharging roller pair 132, whereby separation between the transfer-receiving member 122 and the substrate paper (not shown) of the recording paper 102 is rendered easier.

And, the laminated body of the transfer-receiving member 122 and the recording paper 102 having passed through the discharging rollers comes into collision against the separating nail 134, where the transfer-receiving member 122 having transferred the coating layer (namely, the recorded layer) not shown in the recording paper is completely separated from the substrate paper (not shown). The transfer-receiving member thus separated 122, after sliding over the upper part of the nail 134, is discharged into the discharging tray 135. Also, the substrate paper (not shown) is discharged into the discharging tray 133 at the lower stage.

In the drawing, S1 and S2 are sensors for detection of the transfer-receiving member 122 and the recording paper 102, respectively, which are arranged before the conveying roller pair 127, S3 is a sensor for detection of the recording paper 102 to be conveyed toward the roller pair 106 after recording by the recording heads 112Y, 112M, 112C and 112B, and S4 is a sensor for detection of the recording paper after delivered from the travelling roller pair 105. Based on the respective detection outputs of these sensors S1–S4, the recording paper 102 can be synchronized with the transfer-receiving member 122.

In the embodiment as describe above, description has been made about the case where the recording paper (for transfer) and the transfer-receiving member are both sheet materials, but both or one of them may be of course in the form of a rolled material.

Further, although not shown in the drawing, it is also possible to add a laminate coating device for coating of a transparent resin for the purpose of protection of the recorded layer in the transfer-receiving member after completion of transfer. In this case, the laminate coating device may be assembled to be integrated within the embodiment of the device as shown in FIG. 4, or provided as a separate body independently of the embodiment of the device.

Further, in this embodiment, ink jet has been employed as the recording means. Although ink jet heads are advantageous in miniaturization of the device, the present invention is not limited thereto, but it is also possible to use ink pens, thermographic recording or electrostatic recording and others.

According to the present invention as described above in detail the images by the ink can be rapidly fixed in the recording step and image recording of high quality can be ensured, thus printing of extremely good quality being effected even on a recording material without ink absorbability.

In particular, printing of good quality can be effected on a semi-transparent or transparent resin film or glass plate, whereby it becomes possible to provide printed products suitable for projection system by OHP or transmission type display system.

What I claim is:

1. An image forming system comprising:

a recording medium having a substrate and an ink receptive layer laminated on said substrate so that said reception layer can be peeled off from said substrate;

a transfer-receiving member having a substrate and an adhesive layer provided on at least one surface of said substrate;

means for recording an ink image on said ink receptive layer of said recording medium;

means for feeding said recording medium to said recording means;

means for pressure contacting said recording medium with said transfer-receiving member to laminate them;

means for feeding said transfer-receiving member to said pressure contacting means; and means for separating said recording medium from said transfer-receiving medium with said ink receptive layer adhered to said transfer receiving member.

2. An image forming system according to claim 1, wherein said ink receptive layer is ink absorptive.

3. An image forming system according to claim 1, wherein said pressure contact means includes heating means.

* * * * *